Feb. 20, 1968   B. V. KESSLER   3,370,253
INTEGRAL MIRROR-PHOTODETECTOR STRUCTURE
Filed March 31, 1964

Bernard V. Kessler
INVENTOR.

BY
ATTORNEY.

AGENT.

United States Patent Office 3,370,253
Patented Feb. 20, 1968

3,370,253
INTEGRAL MIRROR-PHOTODETECTOR STRUCTURE
Bernard V. Kessler, Takoma Park, Md., assignor to the United States of America as represented by the Secretary of the Navy
Filed Mar. 31, 1964, Ser. No. 356,331
6 Claims. (Cl. 331—94.5)

ABSTRACT OF THE DISCLOSURE

A combination mirror and photosensor for use in an optical maser comprising superposed layers, one being of highly reflective material and the other being of photoelectric material. That part of the incident light which is transmitted through the mirror causes photoelectric action in the photosensor which is used as a measure of the intensity of the incident radiation.

---

The invention described herein may be manufactured and used by or for the Government of the United States of America for governmental purposes without the payment of any royalties thereon or therefor.

This invention relates to the art of optics and more particularly to a photodetector having a specularly reflecting layer applied to the photosensitive element therein. The invention has particular utility in an optical maser system, where the reflecting layer may constitute an element of the optical resonant cavity while the photodetector provides information from which the intensity of the incident radiation may be determined.

Previously, when it has been desired to make measurements of the intensity of the radiation from an optical maser for example, a measuring device such as a phototube, photomultiplier, semiconductor or the like has been inserted in the optical path to intercept, absorb and measure the incident optical energy. Often a beam splitter is employed to divide the light to send only a portion thereof to the photodetector. In such arrangements, the optical system lacks compactness and there are unpredictable losses resulting from scattering in the long optical air paths between the source and detector and at the many optical interfaces. Moreover, because these systems are generally open to the surrounding atmosphere, dust and dirt can enter to further reduce the efficiency of the measurement and to degrade the calibration of the measuring device.

One known optical system which exhibits the above mentioned disadvantages is the ring laser or optical maser gyro, as described for example by Macek and Davis in Applied Physics Letters, volume 2, No. 3, February 1, 1963, at page 67. In this device, counter-rotating light beams are established in a circuitous path by means of mirrors, one of which is taken as the exit window of the system. When the system is subjected to angular rotation, a frequency difference is established between the two beams and a beat note arises. Since the two beams diverge in space after leaving the exit window, it is necessary to provide additional mirrors to make them co-linear so that the beat-note can be detected. This entails extended air paths and additional optical interfaces where losses can occur. Moreover, it is difficult to accurately align the additional mirrors.

Accordingly, it is an object of this invention to overcome the aforementioned disadvantages of the prior art by eliminating losses due to scattering from extended air paths and minimizing the number of optical interfaces required in a particular optical system.

Another object of the invention is to provide an improved optical maser, the output energy of which may be continuously and accurately monitored without impairing the utility of the device for normal operation.

Yet another object of the invention is to provide an optical maser gyro wherein the beat notes between counter-rotating beams can be detected without the use of external combining optics with their attendant disadvantages of extended path lengths, losses at optical interfaces, contamination by dirt or alignment problems.

The objects of the invention are achieved by the provision of a compact integral mirror-photodetector structure which consists essentially of a reflective coating having high reflectivity and low transmittance at the operating frequency, this coating being disposed on a photosensitive element which can sense the radiation transmitted through the reflecting layer. The contiguous relationship of the elements materially increases the efficiency of the system. No air scattering is possible and the number of necessary optical interfaces is reduced to a minimum. Moreover, this arrangement provides a saving in weight and space as well as increased reliability. These results are of great value where the device is to be used in a navigation device such as the ring laser described above.

Other objects, advantages and novel features of the invention will become apparent from the following detailed description when considered in conjunction with the accompanying drawing wherein.

Figure 1:
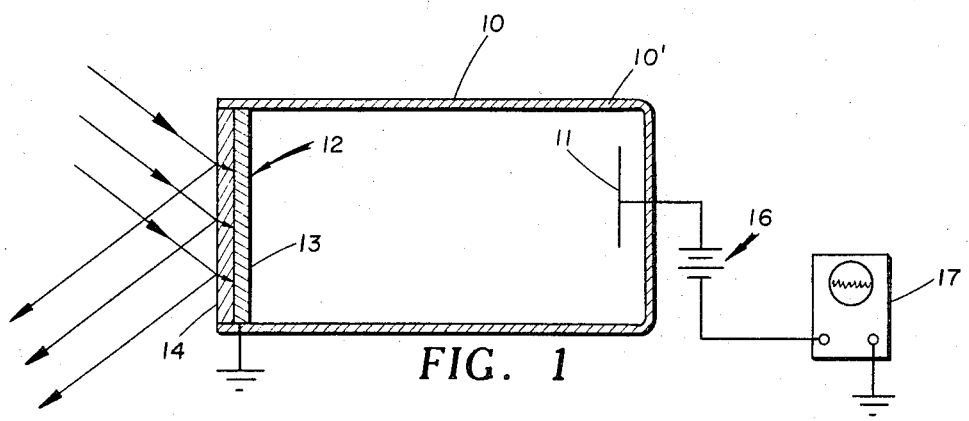
FIG. 1 is a diagrammatic showing of a mirror-photodetector illustrating the principles of this invention.

Referring now to FIG. 1 there is shown for illustrative purposes a phototube 10 in accordance with the invention. Contained within the tube's envelope 10' are an anode 11 and the integral mirror-photocathode 12. Mirror-photocathode 12 is shown in FIG. 1 as made up of two parallel, contiguous layers 13 and 14, layer 13 being a photocathode of any suitable material and layer 14 being a mirror. Mirror layer 14 may be a metal film, or a multiple layer dielectric element evaporated onto or otherwise applied to that surface of photocathode 13 which is exposed to the radiation to be measured. Multiple layer dielectrics are preferred over metals because they provide higher reflectivity, low transmission losses, and narrower wavelength selective reflectivity. The multiple layer dielectric element may be composed of a quarter wave stack of such substrate materials as, for example, magnesium fluoride and zinc sulfide having the desired degree of reflectivity for a particular wavelength of radiation. Reference may be made to Section 20 of the Military Standardization Handbook, MIL-HDBK-141, of October 5, 1961 on "Optical Design," for detailed descriptive information on the various conventional multiple layer dielectric element designs.

For the purpose of measuring the output of the phototube there is provided an external circuit consisting of a battery 16 and an oscilloscope 17, although it is to be understood that other measuring circuits may be substituted as desired. The operation of the device should now be clear. Radiation incident on the surface of mirror 14 will be partially reflected and partially transmitted as shown diagrammatically in FIG. 1. That portion of the incident light which is transmitted through mirror 14 falls on photocathode 13 and causes emergent photoemission therefrom. Emitted electrons are accelerated to the anode and the resulting signal is displayed on the oscilloscope 17.

Figure 2:
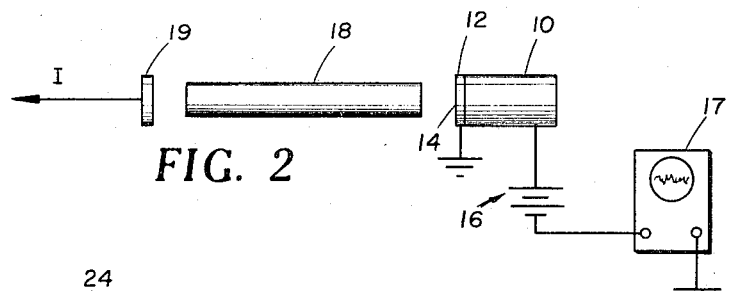
FIG. 2 is a diagrammatic showing of an optical maser system in which the invention is employed.

FIG. 2 illustrates one way in which the photodetector may be used in an optical maser system consisting of a rod 18 of pink ruby or other material capable of generating coherent monochromatic radiation disposed in a Fabry-Perot resonant cavity. Phototube 10 is positioned so that mirror 14 may take the place of the totally reflecting mirror of the Fabry-Perot system. The other mirror, which is partially transmitting, is retained as the output mirror and is shown at 19 in FIG. 2. Other essential elements, such as a pump lamp, have not been shown in the drawing for purposes of clarity.

In the operation of the embodiment of FIG. 2, mirrors 14 and 19 will sustain oscillation in the cavity as will be understood by those skilled in the art. Part of the radiation resulting from stimulated emission will be transmitted through mirror 19 as the output of the system. This is designated by the vector I in FIG. 2. Part of the radiation will also be transmitted through mirror 14 to fall on photocathode 13 to produce a signal to be displayed on oscilloscope 17 in the manner described above. Since the relative reflectivity and transmittance of both mirrors 14 and 19 is known or can be determined, it should be clear that the information obtained from oscilloscope 17 may be related to the output intensity of the optical maser. The output energy of the system can thereby be continuously monitored without interfering with its normal operation and without the disadvantages possessed by the prior art.

Figure 3:
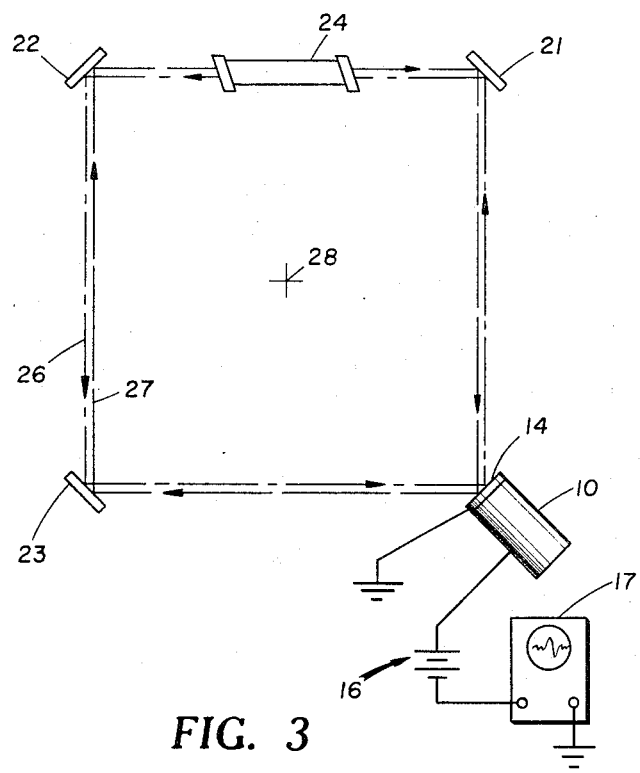
FIG. 3 is a schematic showing of an optical maser gyro utilizing this invention.

FIG. 3 schematically shows an optical maser gyro which employs the present invention. As mentioned above, such devices have been described in the literature and reference is directed to the Macek and Davis publication for the theory of operation thereof. As shown in FIG. 3 the optical circuit involved in this system is a ring defined by four mirrors 21, 22 and 23, mirror 14 of the integral mirror-photodetector of the invention being the fourth mirror of the set. In the illustrated embodiment the mirrors are shown as located at the corners of a square but it should be understood that the optical circuit may be a polygon of any number of sides. A continuous wave light source, such as a helium-neon gas optical maser 24, is located in the optical circuit between mirrors 21 and 22. The output from maser 24 in both directions is reflected around the circuit by the corner mirrors, thus establishing clockwise and counterclockwise traveling waves as represented by rays 26 and 27 in FIG. 3.

If this system is rotated, say about an axis through point 28 perpendicular to the plane of the figure for example, a frequency difference arises between the two waves because the rotation produces a differential change in cavity path-length. A beat frequency proportional to the rate of angular rotation will then be observable between the two waves. In the prior art the observation of this beat note is accomplished by extracting the two waves through one of the corner mirrors, then rendering them co-linear by means of external combining optics, and finally mixing them on a photocathode in a photodetector.

In the optical maser gyro as shown in FIG. 3, the integral mirror-photodetector of this invention has been substituted for the extracting corner mirror of the prior art system. The counter-rotating beams are together at mirror 14 and, because photocathode 13 is in abutting relationship to mirror 14, the beat note is detectable at the mirror and the necessity for external combining optics is obviated. Thus a more compact optical maser gyro has been described which provides all of the above-noted advantages of improved efficiency and reliability.

Obviously many modifications and variations of the present invention are possible in the light of the above teachings. For example the mirror of the photodetector may be a vacuum deposited silver surface, may be of metal other than silver, or it may be a multiple layer dielectric. Moreover, the photodetector need not be a phototube but may be a photomultiplier or a semiconductor device. It is therefore to be understood that within the scope of the appended claims the invention may be practiced otherwise than as specifically described.

What is claimed is:
1. An optical maser system, comprising:
   a body of material capable of generating coherent monochromatic radiation;
   a photodetector device having a photosensitive element for producing electrical manifestations which are a function of the intensity of said coherent monochromatic radiation striking a surface thereof, and a reflective coating in contiguous relationship over the entirety of said surface, said reflective coating having a transmittance whereby a portion of the radiation which is transmitted through said reflective coating causes photoelectric action in said photosensitive element, and
   a plurality of mirrors including said reflective coating for defining an optical resonant cavity surrounding said body of material whereby said coherent monochromatic radiations may be continuously used and simultaneously the magnitude of said radiation indicated by the photoelectric action in said photosensitive element.

2. An optical maser system as defined in claim 1 wherein said reflective coating comprises a multiple layer dielectric element.

3. An optical maser system as defined in claim 1 wherein said resonant cavity is a Fabry-Perot cavity, and wherein said plurality of mirrors is two in number.

4. An optical maser system as defined in claim 3 wherein one of said two mirrors is used to transmit said coherent monochromatic radiation for use while at the same time the other of said two mirrors is used as a part of said photodetector device for measuring said coherent monochromatic radiation.

5. An optical maser system as defined in claim 1 wherein said plurality of mirrors defining said resonant cavity forms a polygon; and wherein said body of material is located between at least two of said plurality of mirrors.

6. An optical maser system as defined in claim 5 wherein said body of material is a helium gas optical maser.

References Cited

UNITED STATES PATENTS

| | | | |
|---|---|---|---|
| 3,055,257 | 9/1962 | Boyd et al. | 331—94.5 |
| 3,109,097 | 10/1963 | Waard et al. | 88—5 |
| 3,170,122 | 2/1965 | Bennett | 331—94.5 |
| 3,202,825 | 8/1965 | Brown et al. | 250—211 |
| 3,229,222 | 1/1966 | Sorokin et al. | 331—94.5 |

FOREIGN PATENTS 149,892   11/1961   USSR.

OTHER REFERENCES

Javan et al.: Frequency Characteristics of a Continuous-Wave He-NE Optical Maser, Journal of Optical Society of America, vol. 52, No. 1, January 1962.

JEWELL H. PEDERSEN, *Primary Examiner.*

B. J. LACOMIS, *Assistant Examiner.*